(12) United States Patent
Said et al.

(10) Patent No.: US 9,145,299 B2
(45) Date of Patent: Sep. 29, 2015

(54) STEAM METHANE REFORMING REACTOR OF SHELL AND TUBE TYPE WITH CYLINDRICAL SLOTS

(71) Applicant: King Fahd University of Petroleum and Minerals, Dhahran (SA)

(72) Inventors: Syed Ahmed Mohammed Said, Dhahran (SA); Shakeel Ahmed, Dhahran (SA); Mohammed Waseeuddin, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 14/106,169

(22) Filed: Dec. 13, 2013

(65) Prior Publication Data

US 2015/0166338 A1 Jun. 18, 2015

(51) Int. Cl.
*B01J 7/00* (2006.01)
*C01B 3/38* (2006.01)
*B01J 12/00* (2006.01)

(52) U.S. Cl.
CPC .............. *C01B 3/384* (2013.01); *B01J 12/00* (2013.01); *C01B 2203/0233* (2013.01); *C01B 2203/0283* (2013.01); *C01B 2203/0833* (2013.01); *C01B 2203/1058* (2013.01)

(58) Field of Classification Search
CPC ............... C01B 2203/0811; C01B 2203/0816; C01B 2203/0822; C01B 2203/0827; C01B 2203/0833; C01B 2203/0838; C01B 2203/0844; B01J 2208/00106; B01J 2208/00115; B01J 2208/00168; B01J 2208/00176; B01J 2208/00185; B01J 2208/00194; B01J 2208/00203; B01J 2208/00212; B01J 2208/00221; B01J 2208/0023

See application file for complete search history.

(56) References Cited

U.S. PATENT DOCUMENTS

| | | | | |
|---|---|---|---|---|
| 4,657,741 | A * | 4/1987 | Vogl | 422/202 |
| 2004/0178765 | A1* | 9/2004 | O'Brien et al. | 320/101 |
| 2004/0262167 | A1* | 12/2004 | Burch et al. | 205/637 |
| 2007/0224094 | A1* | 9/2007 | Park et al. | 422/188 |
| 2009/0253005 | A1* | 10/2009 | Muehlner et al. | 429/19 |
| 2009/0320726 | A1* | 12/2009 | Loving | 110/213 |
| 2011/0200493 | A1* | 8/2011 | Cui et al. | 422/198 |
| 2011/0200516 | A1* | 8/2011 | McAlister | 423/418.2 |
| 2012/0141894 | A1* | 6/2012 | Sonnichsen et al. | 429/425 |
| 2012/0159848 | A1* | 6/2012 | Lutz | 48/61 |
| 2012/0231359 | A1* | 9/2012 | Fuju et al. | 429/420 |
| 2014/0112863 | A1* | 4/2014 | Forsberg et al. | 423/650 |
| 2015/0048277 | A1* | 2/2015 | Volpi et al. | 252/373 |

FOREIGN PATENT DOCUMENTS

| | | |
|---|---|---|
| CN | 201850132 | 6/2011 |
| JP | 2012-218994 | 11/2012 |
| KR | 10-2013-0079260 | 7/2013 |

* cited by examiner

*Primary Examiner* — Imran Akram
(74) *Attorney, Agent, or Firm* — Oblon, McClelland, Maier & Neustadt, L.L.P.

(57) ABSTRACT

A convectively heated steam/methane reformer having a shell and tube reforming reactor for hydrogen production. A reactor core containing the reactants is convectively heated by hot air flowing through the shell or annulus of the reactor. Heated air is supplied to the reactor through several fluid inlets on the shell side of the reformer.

9 Claims, 5 Drawing Sheets

STEAM METHANE REFORMING REACTOR OF SHELL AND TUBE TYPE WITH CYLINDRICAL SLOTS

BACKGROUND OF THE INVENTION

1. Technical Field

The present invention relates to a methane reforming reactor used to convert methane gas to hydrogen through the use of a tube and shell heat exchanger in which the heat exchanger contains a tube surrounded by a shell. The shell forms an annulus around the tube that allows for convective heat exchange between the tube and a heating medium flowing in the annulus and also maintains high temperatures during a reaction. The heating medium flows into the annulus through a plurality of hot air inlet ports positioned along the shell of the reforming reactor.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Hydrogen, as a fuel has gained much popularity in the present world energy sector due to its potential advantages over hydrocarbon fuels for its clean combustion characteristics and higher calorific value. Hydrogen is produced by a number of ways such as electrolysis, steam methane reforming, auto thermal reforming, partial oxidation reforming and some extensions of these processes. Hydrogen production via electrolysis is an expensive method due to the high production costs involved because of electricity production. Other processes use hydrocarbons as the main reactant for hydrogen production. Among all of the methods above, steam methane reforming (SMR) process is the cheapest, oldest and most widely used method to produce hydrogen commercially worldwide. Steam reforming is, in industrial practice, mainly carried out in reactors referred to as steam reformers, which are essentially fired heaters with catalyst filled tubes placed in the heater. The inlet feed that is methane and steam (along with some traces of hydrogen), enter from one end of the tube and leave as syngas from the other end after the endothermic steam methane reforming reaction takes place.

The above mentioned process may also be carried out in reactors referred to as heat exchange reformers wherein the heat required for the reaction is supplied predominantly by convective heat exchange. The tubes are essentially filled with catalyst. The heat required for the reaction in a convectively heated reformer is supplied by flue gas or process gas or by any available hot gas. The heat and mass balance is considered only on the process side (tube side), thus depicting no difference between heat exchange reforming and fired tubular reforming. The process schemes differ only in the amount of latent heat in the flue gas or process gas and the way in which this heat is used.

These heat exchange reformers are usually installed in combination with another fired tubular reformer placed inline. In this case, the former one is termed as a pre-reformer and the latter one as reformer. To avoid the use of the fired tubular reformer downstream of the pre-reformer, the reforming in the pre-reformer or the heat exchange reformer should be enhanced in order to give higher conversion of methane into hydrogen. Since steam methane reforming is a highly endothermic reaction, the heating medium which enters the heat exchange reformer at one end and leaving from the other end is not sufficient enough to give high conversions of methane to hydrogen.

Conventional shell and tube reforming reactors have one inlet for the heating source in the shell side of the reformer. A reforming reactor of the shell-and-tube configuration can have a shell-side fluid flow path around a tube bundle with a longitudinal configuration. The shell-side around a fluid inlet may be equipped with a distributor plate below the lower end of the tube bundle, and a flow sleeve in an enlarged-diameter discharge annulus at an upper end adjacent to the tube sheet to prevent short-circuiting of the shell-side fluid into the shell-side fluid outlet. Such elongated shells have low and high temperature ends where the fluid inlet to the shell side is at a high temperature for receiving hot gas feed and the tube side inlet adjacent to the low temperature end for receiving a reactant gas feed. The tube bundle may have an inlet secured to the tube sheet for receiving a feed mixture and for discharging product gases adjacent to the shell side to be mixed with the hot gas stream. Another conventional design for the reactor includes a slight alteration on the tube side in which a plurality of ring baffles and lattice baffles provide a lower shell-side pressure drop. Longitudinally spaced traverse ring baffles with one or more longitudinally placed space guides can be positioned along the tube bundle.

A shift reactor can be placed intermediate to two conventional reforming reactors of the shell and tube type to convert carbon monoxide in the outlet of the first reactor to carbon dioxide. The shell and tube configuration is typical to the conventional ones discussed earlier however with a modification of introducing an intermediate shift reactor for carbon monoxide conversion. The shell sides of both the reactors include an inlet for a hot gas feed whereas the tube side has an inlet for the reactant gases. One design includes a disposed reformer tube with partially filled catalyst within a radiant section. The reformer may also include a transition section coupled to the radiant section, a convective section coupled to the transition section, and a plurality of pre-reformer tubes disposed in the transition section. The plurality of pre-reformer tubes can be filled with a second catalyst and fluidly coupled to the reformer tube via a line external to the plurality of pre-reformer tubes. The plurality of pre-reformer tubes include at least one extended surface disposed. The second reformer can be coupled to the reformer tube and to an oxidant source. Another steam/hydrocarbon reformer employing a convection-heated pre-reformer is based on a design in which the pre-reformer contained catalyst-filled tubes are disposed in a transition section between radiant and convection sections. The pre-reformer tubes are transverse to the flow of flue gas from the radiant section. The process of firing the radiant section to produce hot flue gases allow the gases to pass through the transition and convection sections of the reformer. The flue gases then pass over the hydrocarbon feed stream through a preheat exchanger for heat exchange with the hydrocarbon feed.

The above-mentioned conventional designs for shell and tube configuration reformers focus on heating the reformate feed within several zones of the reactor or within several reactors in a manner that is not quite cost effective. Also, tube bundles containing baffles and supports increase the cost for the material installed in the reformer. Moreover, temperature profile is not given its due importance in the design of the reforming reactor.

In order to address these disadvantages a reforming reactor is disclosed which provides superior performance and has advantages including: (1) capability to maintain high temperature in the shell side annulus of the reactor which in turn enhances the conversion of methane, and (2) providing greater conversion when compared to a reactor of the same length with only one inlet at the same mass flow rates of heated air in the shell.

BRIEF SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

In one embodiment of the present invention a methane reforming reactor system is used to convert methane into hydrogen gas.

In another embodiment, the system includes a shell and tube reactor. Reactants mix with a catalyst inside the tube of the shell and tube reactor and conversion of methane to hydrogen occurs when the catalyst in contact with the methane inside the tube is heated to high temperatures and forms hydrogen gas.

In another embodiment, the shell of the reformer includes multiple hot air inlet ports and at least one hot air outlet port which maintain temperature control.

In another embodiment, the hot air inlet ports may be positioned in vertical rows along the shell of the reformer.

In another embodiment, the hot air inlet ports may be positioned in a rotational pattern across the shell of the reformer.

In another embodiment, the one or more hot air inlet ports include valves to independently control the flow of a heating medium.

In another embodiment, the hot air inlet ports may be positioned to the shell of the reformer at an angle ranging from 45°-90°.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
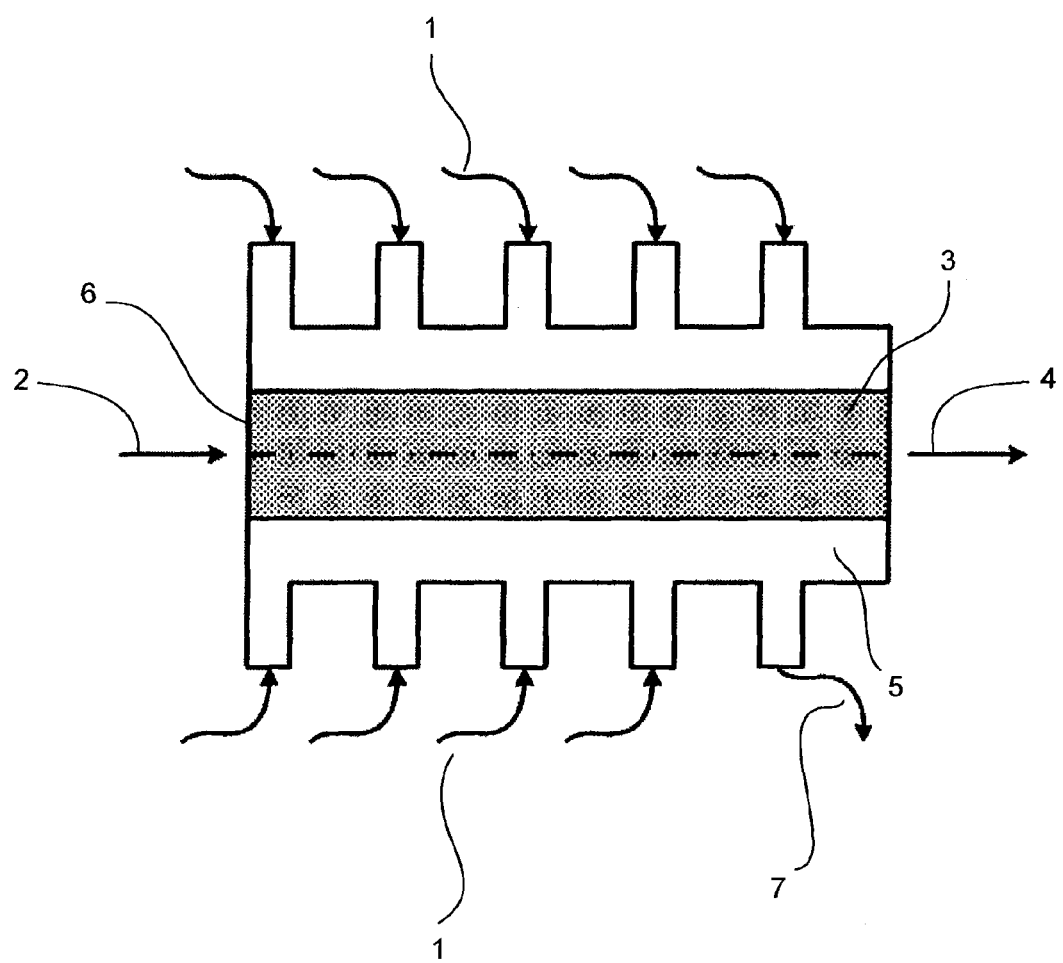
FIG. 1 is a schematic of the methane reforming reactor.

Referring now to the drawings, wherein like reference numerals designate identical or corresponding parts throughout the several views.

In one embodiment of the present disclosure, a heat exchange reformer is able to maintain a significantly higher temperature in the shell annulus and the reactor tube of the reformer. Temperature in the shell annulus of the reactor is maintained by having various inlets for heated air or process gas or flue gas along the periphery of the reactor. The temperature may be maintained so that it is consistent across the reactor or has one or more zones or locations of different temperature. Maintaining a consistently high temperature prevents a temperature drop in the shell side of the reformer and allows the reaction to take place more effectively, yielding a higher percentage of hydrogen gas product once methane conversion occurs. A reactor having a uniform temperature across the length of the reactor tube may show temperature variations of 100-200° C. across the entire length of the reactor tube. The temperature difference range is 100-200° C. In another embodiment the tube side of the shell and tub reactor has a temperature profile or gradient. The gradient can ascend from cold to hot or descend from hot to cold.

FIG. 1 is a schematic diagram of the steam methane reforming reactor. The reformer includes a shell 5. The shell 5 of the reformer also contains hot air inlets 1 that allow hot air and/or other heating medium to enter the shell 5. Herein a hot air inlet includes inlets for other gases including inert and/or reactive gases and mixtures of gases. The reformer includes a tube 6 in which the reactant gases for reforming enter the tube side into the porous zone 3 containing the catalyst. The reactant gases enter porous zone 3 and the hot air enters the shell side 5 via the hot air inlets 1, which are slots available on the shell of the reactor. The hot air inlets 1 provide an advantage of maintaining higher temperatures inside the shell or shell annulus of the reformer which enhances the reforming process. Conversion is achieved at higher rates when compared to a conventional shell and tube heat exchange reformer of the same length as it is subjected to high temperatures along the initial length of the reactor. Thus, conversion of methane into hydrogen can be achieved at a higher rate when compared to a conventional tube and shell type of reformer of the same dimensions with only one inlet for hot air.

In other embodiments the inlet is a slit or a grating. In still a further embodiment the inlet may be a nozzle that penetrates through the wall of the shell. The nozzle may be positioned at locations close to the reactor core to preferentially heat certain portions of the reactor.

In yet another embodiment, the diameter or area of the face of the inlet may be the same for all inlets or it may vary across each inlet, containing both larger and smaller inlets ranging in size.

A heating medium enters the hot air inlets 1 and into the shell side 5. The heating medium includes but is not limited to air, nitrogen, helium or a combination of 2 or more heating mediums in fluid form that can be used alone or simultaneously. The heating medium passes through the hot air inlets 1, through the shell side 5 and out through hot air outlet 7. Once the reactant gases are heated to a sufficient temperature methane conversion inside the porous zone 3 is able to take place.

The porous zone 3 is included inside the tube side of the reactor. The catalyst used for methane conversion is located inside the porous zone. Catalysts include but are not limited to nickel (Ni) and magnesium aluminate ($MgAl_2O_4$). Preferably, nickel is the catalyst used for methane conversion inside the porous zone. Steam and methane enter the feed 2 into the tube side 6. Once the steam and methane enter the tube side 6, they react in the presence of the catalyst inside the porous zone 3. A reaction between the steam and methane takes place when the hot air from the inlets 1 reaches a temperature in the range of 700-1800K, 800-1700K, or 900-1500 K. Preferably the hot air temperature on the shell side is at 1500 K. Product gases that exit the tube side include carbon monoxide (CO), carbon dioxide ($CO_2$) and hydrogen gas ($H_2$).

The hot air inlets 1 are positioned mostly near the feed inlet 2 on the reactant side of the reformer. Placing the hot air inlets 1 towards the product side 4 of the reformer would have less effect on conversion because if the hot air inlets 1 were provided near the product side 4, the hot air would leave the reactor shell and enter the hot air outlet 7 before transferring all its heat to the reactant gases.

In another embodiment of the invention, the shell side of the methane reformer is a single zone with no baffles. Multiple inlets line the shell side of the methane reformer.

In another embodiment of the invention, the hot air outlet is positioned at the face of the reactor in the axis of fluid flow. The hot air outlet may be positioned at any coordinate on the face of the reactor that lies parallel to the tube outlet. The hot air outlet may lie adjacent to the tube outlet, on the perimeter of the shell or anywhere on the surface of the shell so long as the hot air outlet does not overlap with the tube outlet. A single hot air outlet allows the heating medium to exit the annulus out of a single exit point. Positioning the hot air outlet on the face of the reactor allows for controlled gas flow from the reactant side to the product side of the tube and parallels the linear direction of the reaction in the tube by way of the annulus.

Figure 2A:
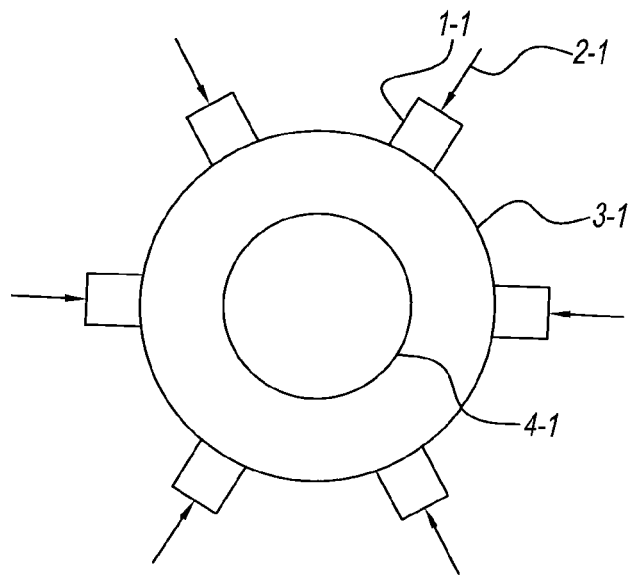
FIGS. 2A-2B illustrate the positions of the hot air inlets along the shell of the reformer.
Figure 2B:
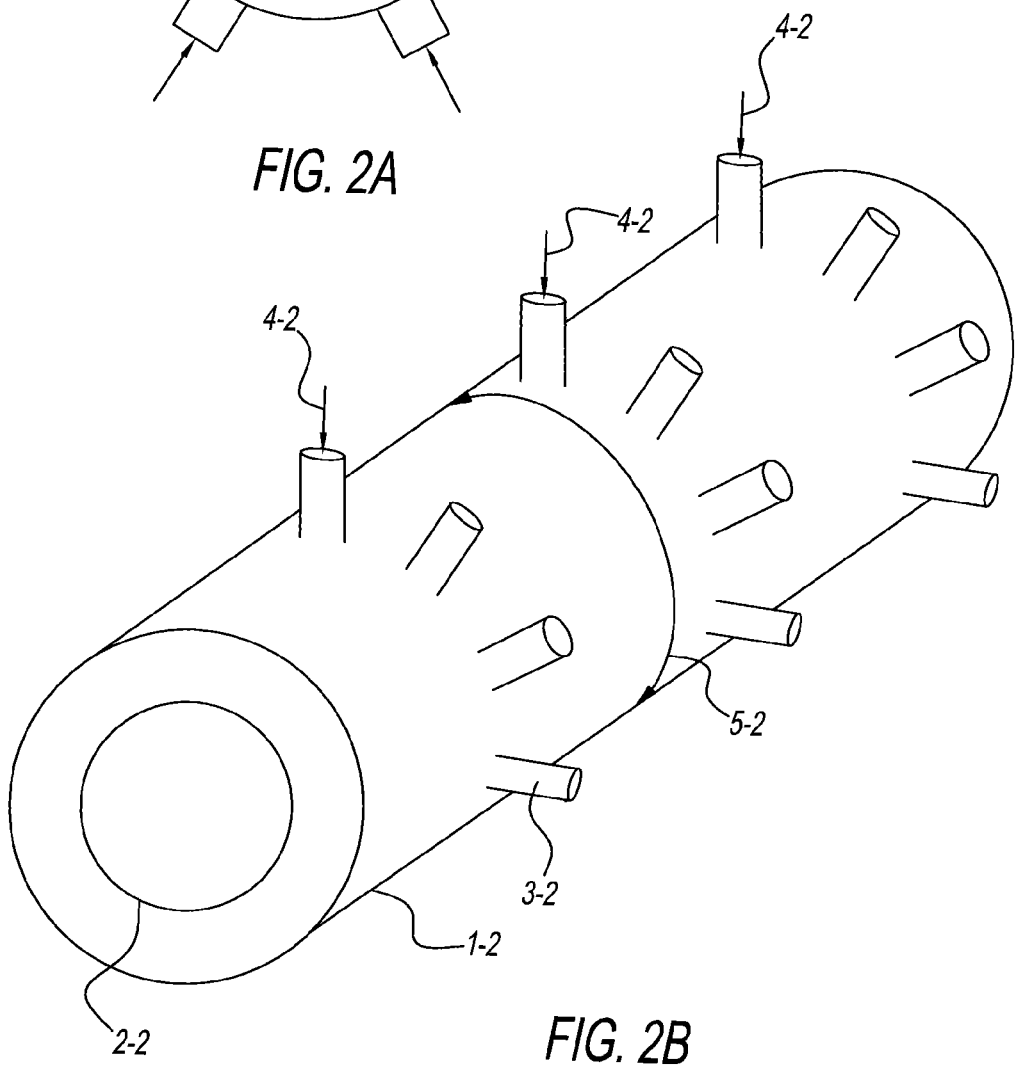

FIGS. 2A and 2B illustrate the positioning of the hot air inlets along the shell side of the methane reformer. FIG. 2B illustrates the shell side 1-2 of the methane reformer. The outer exterior of the shell side 1-2 includes hot air inlets 3-2 that line the reformer. In this particular embodiment, the hot air inlets 3-2 are placed in vertical rows positioned along the tube side shell 1-2. The positioning of the rows of hot air inlets is indicated by the arrow 5-2 placed along the exterior of the tube side 1-2. The shell side 2-2 is heated by the heating medium 4-2 that enters through the hot air inlets 3-2. One or more of the inlets may be replaced with an outlet.

FIG. 2A illustrates a cross section of the methane reformer. The shell side 3-1 includes the hot air inlets 1-1 in which the heating medium 2-1 enters. The tube side 4-1 is heated by the heating medium 2-1 that enters the hot air inlets 1-1. In this embodiment, the cross section of FIG. 2A also illustrates the vertical row arrangement of the hot air inlets 1-1, as they are positioned evenly in a straight vertical line that wraps around the circumference of the tube side 3-1.

Figure 3A:
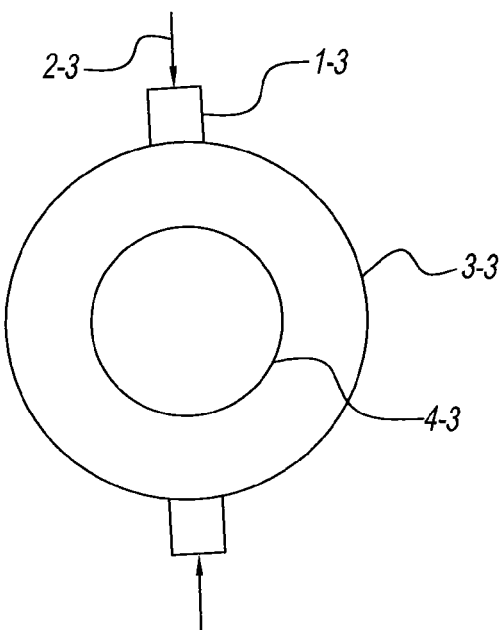
FIGS. 3A-3B illustrate the spiral positions of the hot air inlets along the shell of the reformer.
Figure 3B:
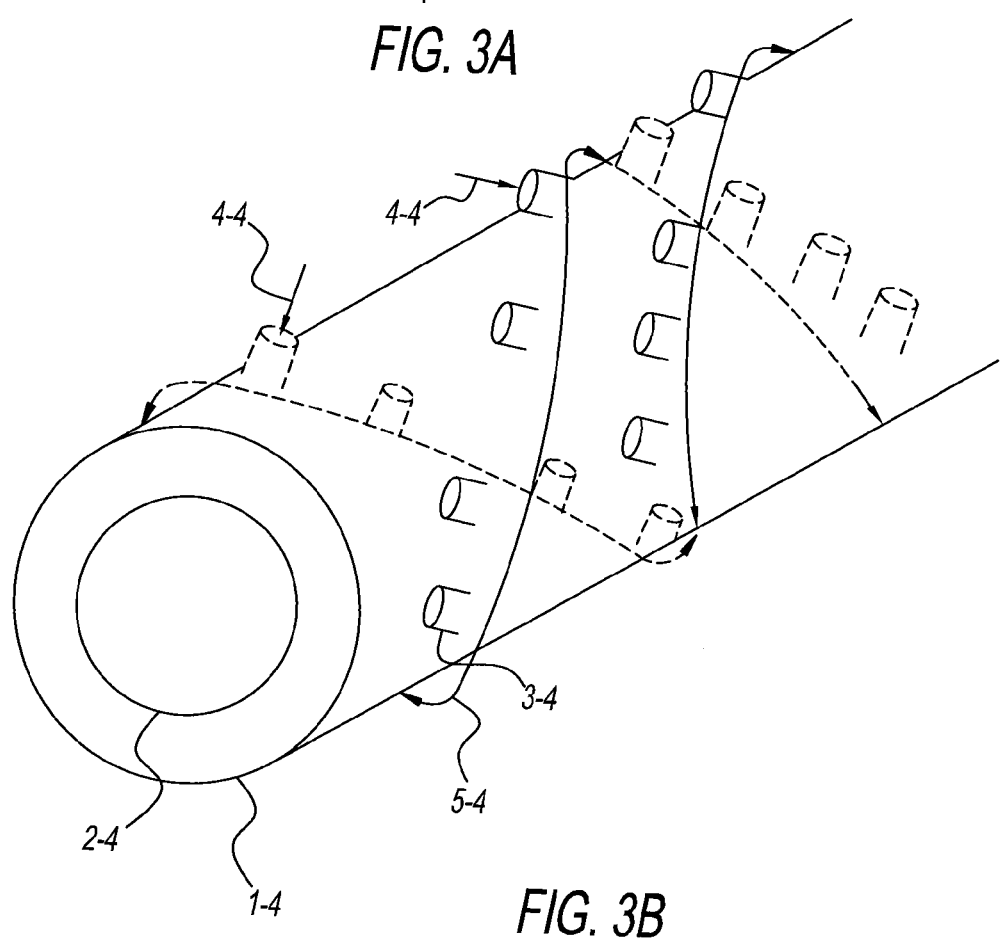

FIGS. 3A and 3B illustrate the positioning of the hot air inlets along the shell side of the methane reformer. FIG. 3B illustrates the shell side 1-4 of the methane reformer. The outer exterior of the shell side 1-4 includes hot air inlets 3-4 that line the reformer. In this particular embodiment, the hot air inlets 3-4 are placed along a spiral shaped axis positioned along the tube side shell 1-4. The positioning of the rows of hot air inlets is indicated by the arrow 5-4 placed along the exterior of the shell side 1-4. The tube side 2-4 is heated by the heating medium 4-4 that enters through the hot air inlets 3-4.

FIG. 3A illustrates a cross section of the methane reformer. The shell 3-3 includes the hot air inlets 1-3 in which the heating medium 2-3 enters. The tube side 4-3 is heated by the heating medium 2-3 that enters the hot air inlets 1-3. In this embodiment, the cross section of FIG. 3A also illustrates the spiral shaped arrangement of the hot air inlets 1-3, as they are spirally positioned to wrap around the circumference of the shell 3-3.

Figure 4:
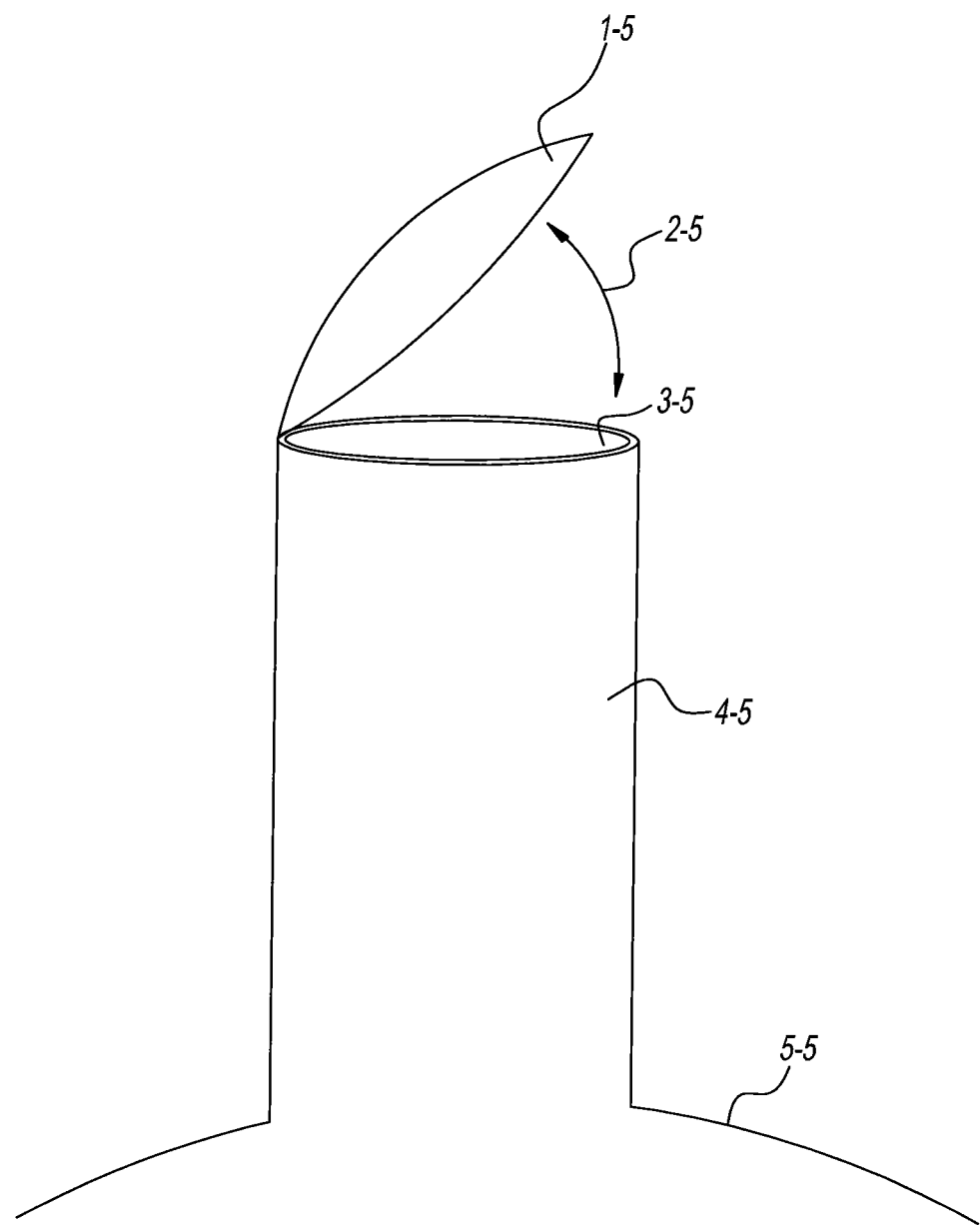
FIG. 4 illustrates an example of a hot air inlet.

In another embodiment of the invention, the hot air inlets contain an apparatus for flow control in the form of valves that may be opened or closed to allow for hot air (heating medium) to flow into the shell side or to restrict hot air flow from entering the shell side. FIG. 4 illustrates an example of a hot air inlet with hot air flow control. The shell side 5-5 is connected to a hot air inlet 4-5 that is placed perpendicular to the shell side 5-5. The hot air inlet contains an opening 3-5 which allows for the heating medium to enter into the hot air inlet 4-5. The valve 1-5 allows for hot air mass and/or flow control by being opened or closed. Opening the valve 1-5 allows for the heating medium to enter the hot air inlet 4-5. Closing the valve 1-5 blocks the heating medium from entering the hot air inlet 4-5. The angle 2-5 demonstrates that the valve 1-5 may be opened or closed at a range of 0°-90° depending upon the desirable amount of heating medium that should enter the hot air inlet 4-5. If maximum heating medium should enter the hot air inlet, the valve should be maintained at an open position. If heating medium should not enter the hot air inlet, the valve should be closed. Preferably, the valves located closest to the entrance of the reactant side of the methane reformer should be open at a 90° angle when a reaction is desired to take place inside the methane reformer.

The inclusion of independently adjustable valves on the hot air inlet allows the flow of the heating medium to be controlled so as to develop a temperature profile in the reactor. For example, relatively hotter heating medium may be introduced at one or more inlets to provide a hot zone in the reactor. Alternately the heating medium flow may be adjusted to compensate for any temperature differences causes by the endothermic reforming reactor in the reactor.

In another embodiment of the invention, the number of inlets on the shell side of the reformer may be in a range of 10-30 inlets. A higher number of inlets allows for more access points for the heating medium to pass through into the shell side of the reformer. More inlets also allow for higher temperature control of the shell side, which can increase reaction productivity and yield higher amounts of the pure hydrogen gas product. The hot air inlets may also be closed one at a time or in groups at a time by the valve in FIG. 4 in order to maintain temperature control. For example, if valves located toward the product side of the reformer are closed and the temperature needs to be raised in the shell side, the adjustable valves may be opened in order to allow more hot air to enter the shell side of the tube to raise the temperature.

In another embodiment, the flow of the heating medium per inlet may be evenly divided across the shell, i.e. air flow rate is maintained the same across the shell. In yet another embodiment, one or more of the hot air inlets has a hot air flow that is +5% or −5% of the mean flow rate across all of the inlets. Preferably, the hot air inlets positioned closest to the tube inlet have a +5% hot air flow above the mean flow rate compared to the hot air inlets positioned further down the shell closer to the tube outlet.

Figure 5A:
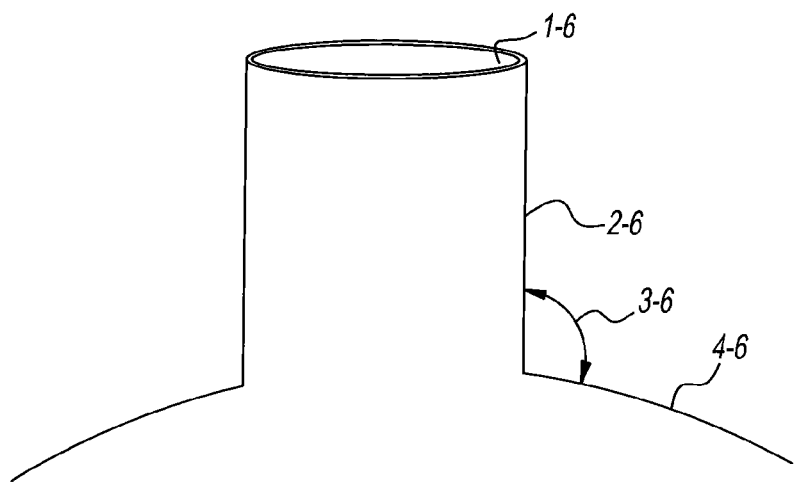
FIGS. 5A-5B illustrate different angles in which the hot air inlets are connected to the shell of the reformer.
Figure 5B:
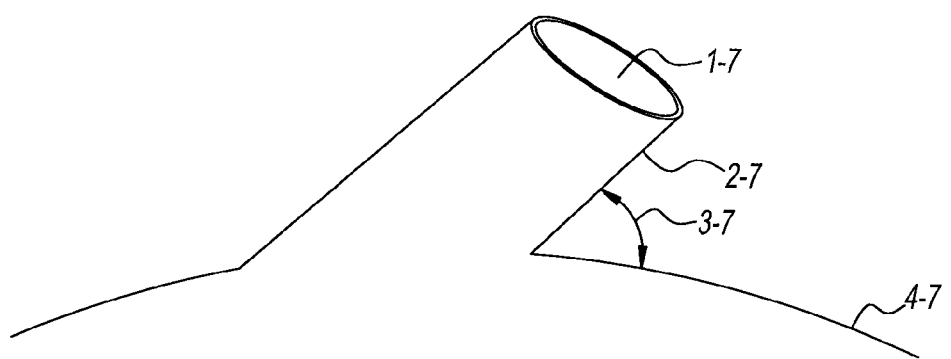

In another embodiment of the invention, the hot air inlets may also be oriented at different angles when connected to the shell side of the reformer to allow for different directions of air flow. FIGS. 5A and 5B illustrate two different ways in which the hot air inlets may be connected to the shell side of the reformer. In FIG. 5A, the hot air inlet 2-6 is connected to the shell side 4-6. The heating medium enters the hot air inlet 2-6 through the top of the inlet 1-6. The hot air inlet 2-6 is perpendicular to the shell side 4-6 and resides at a 90° angle 3-6. In FIG. 5B, the hot air inlet 2-7 is connected to the shell side 4-7. The heating medium enters the hot air inlet 2-7 through the top of the inlet 1-7. The hot air inlet 2-7 resides at a 45° angle 3-7. The hot air inlets may reside on the shell side at angles in the range of 45°-90°.

Comparative Example

A design presented was simulated for different ranges of air temperatures to determine the percentage improvement in methane conversion. Inlet feed consists of steam, methane and some hydrogen. The inlet feed conditions of steam to carbon ratio of 3 and hydrogen to carbon ratio of 1.25 was used. The pressure of the process gas was set to 1.0 bar. The value of Mass flow rate (kg/s) of the heating medium plays an important role for the convectively heated reformer. The heating medium used here was air. Mass flow rate of heated air was kept constant for both the cases of reformer without slots (only one hot air inlet) and that with slots to check for the advantage of using slots. The simulation results are shown in Table 1. The table also shows the temperature of the reactants at the exit of the reactor. It can be noted that the present model gives higher conversions and a higher temperature of the reactants at the exit which are favorable for the steam methane reforming process.

TABLE 1

Comparison of the present design

| Air Temperature, K | Methane Conversion % | | Reactants Exit Temperature, K | |
|---|---|---|---|---|
| | No Slots | With Slots | No Slots | With Slots |
| 900 | 4.9 | 5.6 | 703 | 709 |
| 1100 | 28.6 | 30.5 | 762 | 767 |
| 1200 | 40.6 | 43.1 | 786 | 795 |
| 1273 | 49 | 51.7 | 808 | 815 |
| 1500 | 72.5 | 75.8 | 867 | 876 |

Table 1 shows a comparison of the methane conversion for a conventional one inlet and one exit type of shell and tube heat exchange reformer and a reformer with various inlets on the shell side. Conversions at all temperatures were found to be higher for the latter case since the air temperature was maintained the same due to multiple air inlets along the length of the shell. Thus the reactor design provides improved or enhanced methane conversion for a reactor of the same dimensions.

An aspect of the disclosure includes an improved apparatus and method for convectively heating the steam methane mixture in a shell and tube reforming reactor to form hydrogen. The reactor core containing the reactants is convectively heated by hot air flowing through the shell or annulus of the reactor. Heated air is supplied to the reactor through several cylindrical slots on the periphery of the shell side. Since steam reforming of methane is an endothermic reaction, the several cylindrical slots supplying hot air prevent the temperature in the shell side from dropping and thus provide the required heat for the endothermic steam methane reforming reaction. Also, methane conversion and reactants temperature are enhanced at the exit of the reactor with the use of cylindrical slots.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A steam methane reformer, comprising:
   a tube and shell reactor having an outer shell and a reactor core inside the outer shell, wherein the outer shell and an exterior wall of the reactor core define a shell side annulus configured to heat the reactor core present on the tube side of the tube and shell reactor;
   a plurality of hot fluid inlets connected to the shell of the tube and shell reactor to permit fluid passage of a heating medium into the shell side annulus;
   no more than one hot air outlet connected to the shell of the tube and shell reactor to permit fluid passage of the heating medium out of the shell side annulus;
   wherein the reactor core comprises a feed inlet, a porous zone containing a solid catalyst and a product outlet, wherein a reaction takes place in the porous zone;
   wherein the product outlet is connected to the reactor core and is configured to pass products of the reaction out of the reactor core;
   wherein the plurality of hot fluid inlets are fixed at a spiraled rotational pattern along the shell side of the tube and shell reactor;
   wherein the hot air outlet is positioned away from the feed inlet and is adjacent to the product outlet; and
   wherein the hot air outlet lies parallel to the product outlet and is position along the axis of fluid flow.

2. The reformer of claim 1, comprising 10-30 hot fluid inlets.

3. The reformer of claim 2, wherein:
   the plurality of hot fluid inlets further comprise an adjustable valve that opens or closes to maintain temperature stability inside the shell side annulus.

4. The reformer of claim 3, wherein:
   the adjustable valve may be opened or closed at an angle ranging from 0° - 90°.

5. The reformer of claim 2, wherein:
   the plurality of hot fluid inlets are positioned at an angle ranging from 45° -90° to the shell side of the reformer.

6. The reformer of claim 1, wherein the reaction is endothermic conversion of methane to hydrogen.

7. The reformer of claim 1, wherein the heating medium is selected from the group consisting of air, nitrogen, helium and combinations thereof.

8. The reformer of claim 1, wherein the hot air outlet is positioned on the perimeter of the shell.

9. The reformer of claim 1, wherein the hot air outlet is positioned on the surface of the shell.

* * * * *